Figure 1:
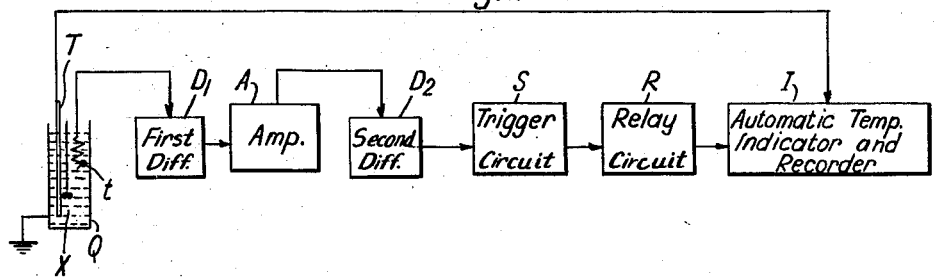

Jan. 26, 1960　　　　　D. S. LEES ET AL　　　　2,922,304
METHOD OR PROCESS OF TESTING APPLICABLE TO THE CONTROL
OF MANUFACTURES IN WHICH TEMPERATURE IS IMPORTANT
Filed Nov. 20, 1956　　　　　　　　　　　　2 Sheets-Sheet 1

Inventors
David Savidge Lees
George Omar Morgan
By Cushman, Darby & Cushman
Attorneys

United States Patent Office 2,922,304
Patented Jan. 26, 1960

2,922,304

METHOD OR PROCESS OF TESTING APPLICABLE TO THE CONTROL OF MANUFACTURES IN WHICH TEMPERATURE IS IMPORTANT

David Savidge Lees and George Omar Morgan, Norton-on-Tees, England, assignors to Imperial Chemical Industries Limited, London, England, a corporation of Great Britain Application November 20, 1956, Serial No. 623,476

Claims priority, application Great Britain December 2, 1955

3 Claims. (Cl. 73—339)

This invention relates to the control of temperature in chemical or physical processes.

According to the present invention there is provided apparatus adapted for indicating transition, and small significant changes in, temperature in a substance comprising a temperature sensitive element which is in contact with the said substance and forms part of an electrical circuit, an electrical differentiator to which the voltage produced in the said electrical circuit by the absorption or development of heat at the transition point is fed, an electronic amplifier to which is fed the differential voltage from the said differentiator, a second differentiator to which the amplified differential is fed, and from which is obtained an indicating or marker pulse, and an indicating and recording device which continuously registers the temperature of the substance and also registers the marker pulses.

Preferably the temperature sensitive element is a thermistor used in conjunction with an accurate thermometer, e.g., a resistance thermometer, which latter is in electrical connection with the indicating and recording device. Alternatively a single temperature sensitive device, e.g., a thermistor, may be used and its output fed in parallel (1) to the first differentiator of the system already defined, and (2) to an amplifier and thence directly to the indicating and recording device.

In the first of these variants the recorder is preferably of the self-balancing Wheatstone bridge type. In the second, the recorder is preferably of the potentiometer type.

The invention finds valuable application in processes utilizing cooling or refrigeration to freeze out a solid on account of the relatively small amount of heat involved in change of phase, especially when the actual amount of the substance changed is small. It is of special value (1) for determining and/or controlling the temperature range within which para-xylene can be efficiently frozen out substantially free from its binary or ternary eutectics with other xylenes from suitable mixed xylenes and (2) thereby controlling the temperature in the succeeding centrifuging stage used for separation of the para-xylene, so that the maximum amount of substantially pure para-xylene can be separated from the liquid. For the former purpose the important limits of temperature are the initial point at which solid para-xylene begins to separate and the point at which the first para-xylene eutectic separates. Control is exercised by adjusting the rate of application of cold so that the temperature is maintained within this range.

The invention will now be described with particular reference to this use. Because of the tendency in the xylene system for super-cooling to occur it is preferred in determining these two transition points to cool the representative sample below the first para-xylene binary eutectic point and then gradually warm it up and determine the two desired temperatures on the melting point curve. Based on these data the freezing process can be conducted efficiently within a temperature range which yields para-xylene of desired purity and/or in desired amount. One method of conducting the invention is as follows.

The sample of xylene mixture is contained in a vacuum type flask provided with a valved outlet in connection with the space between its walls, and immersed in a second larger vacuum flask containing a refrigerant e.g., liquid nitrogen or solid carbon dioxide/methanol. The space between the double walls of the first flask is connected to a pump and by adjustment of the pressure in this space the rate of change of temperature of the xylene can be varied as desired. The mixture is first cooled below the binary eutectic point, e.g., by means of liquid nitrogen. The liquid nitrogen is then replaced by an ice bath and the mixture gradually warmed up. A resistance thermometer is immersed in the xylene, which is continuously stirred, and the temperature is recorded on an automatic temperature recorder, e.g., of Kent or Brown type. A thermistor is also immersed in the xylene mixture and its output after being twice differentiated and amplified electronically is fed as a marking pulse to the recorder, as more fully described hereinafter, and variations in the rate of change of temperature are indicated by peaks in the temperature/time curve. In this way the temperature at which the binary commences to melt and that at which the last solid para-xylene melts are determined, and using these data the temperature range employed in the para-xylene freezing process is controlled as already described.

The general arrangement of a suitable apparatus is shown as a block schematic sketch in Fig. 1 of the accompanying drawings.

Q is a stirred vessel containing the xylene mixture X. T is a resistance thermometer coupled to the temperature indicator and recorder I; $t$ is a thermistor; $D_1$ is the first differentiating electrical network; A is a valve amplifier; $D_2$ is a second differentiating electrical network; S is a sensitive trigger circuit and R is a relay circuit to give a marking pulse on the temperature recorder. In the case of some recorders this is introduced into the galvanometer circuit.

A suitable thermistor for use in determining the temperature in the para-xylene freezing process is a Standard Telephone and Cables type A.5412/100, which is capable of being operated on an 85 volt supply with a 3.3 megohm series resistor to give a sensitivity of about 1 volt/degree centigrade in the region of $-65°$ C., which is near the temperature involved.

Figure 2:
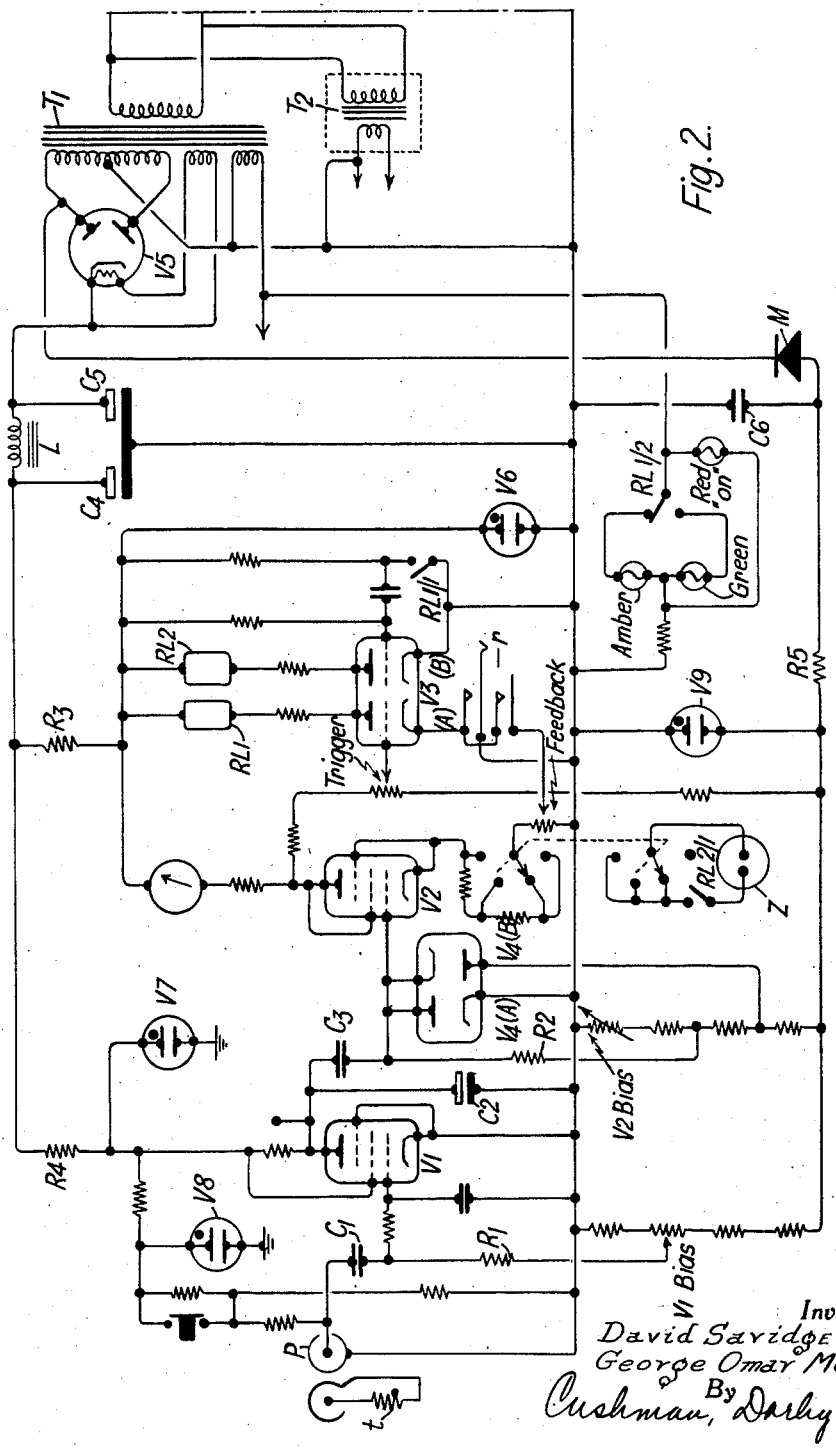

The details of a suitable differentiating system are shown in Fig. 2 of the accompanying drawings.

The E.M.F. from the thermistor $t$ is introduced at plug P and the sub-circuits are as follows:

*(1) Differentiator network, $D_1$*

This comprises a condenser $C_1$, and a resistance $R_1$ and is chosen with characteristics suitable for the temperature/time change in the process, the latent heat, the amount of latent heat involved, and the characteristics of the thermistor. In the general case a time constant of from 1 second to 1 minute is a suitable range, determined on the one hand by the duration of the development of the transition, and on the other by the practical requirement of as rapid operation as possible compatible with reliability. In the cooling of mixtures containing para-xylene a time constant of 30 seconds is suitable.

(2) Amplifier

This comprises a pentode $V_1$, with an RC smoothing circuit connected between its control grid and differentiator $D_2$, and the amplified output taken from its anode, and may have a further smoothing condenser $C_2$ connected to its anode. Bias control is as shown.

(3) Second differentiator, $D_2$

This has a similar time constant to $D_1$ but a lower resistance $R_2$ and a higher capacity $C_3$ are used in order to render the output voltage less liable to effects by the limiting diodes $V_4$.

(4) Trigger circuit and relay

This comprises pentode $V_2$ and triode $V_3(A)$ with associated components, and is provided with some positive feedback from $V_3(A)$ to $V_2$. When the control grid voltage of $V_2$ rises above the level fixed by the $V_2$ bias control, sufficient current flows in $V_2$ to cut off the current in $V_3(A)$, and thus de-energize the relay $RL_1$, which normally is energized.

(5) Relay circuit

This is to provide a pulse for feeding to the indicating and recording device through the terminal socket Z. When $RL_1$ is de-energized contact $RL_{1/1}$ is closed and the valve $V_3(B)$ is cut off for a period determined by the time-constant of the circuit connected to its control grid. $RL_2$, which is normally energized, is thus de-energized for this interval and one pair of its contacts $RL_{2/1}$ is used to introduce a deflecting current in the galvanometer circuit of the recorder I (see Fig. 1). This produces a marker peak in the temperature/time curve traced by the recorder, and this peak indicates the desired temperature.

The power supply is of conventional type comprising a transformer $T_1$, a valve rectifier $V_5$, a smoothing filter with a choke L and two condensers $C_4$ and $C_5$. Variations in the supply voltage are minimised by means of neon tubes $V_6$ and $V_7$ with their associated dropping resistors $R_3$ and $R_4$ respectively. The neon tube $V_6$ is used to stabilize the anode voltage supply to valves $V_2$ and $V_3$. The other neon tube $V_7$ stabilizes the supply to $V_1$, and is also connected to a further neon tube $V_8$ to give a very stable thermistor voltage supply, e.g., with variations of less than 0.1%.

A negative voltage supply is provided by a metal rectifier M with its smoothing condenser $C_6$ and stabilized by a neon tube $V_9$ with dropping resistor $R_5$.

The heaters of $V_1$ and $V_2$ are supplied from a constant voltage transformer $T_2$. Alternatively baretter stabilization could be used.

r is a socket for connection of a test recorder.

The invention includes as another feature the apparatus above described, and may, if desired, be fitted with indicator lights for showing the state of the differentiator at any time.

We claim:

1. Apparatus for indicating temperature transition points of a substance comprising temperature sensitive means contactable with said substance for causing a first signal varying in accordance with the variations in temperature of the substance, means including differentiating means for causing a second signal which is the second differential of at least a given range of said first signal, said second signal including at least one sharp variation therein corresponding to a temperature transition point of said substance, and means responsive to said second signal for indicating the occurrence of at least said one sharp variation, wherein the indicating means includes a trigger circuit and means including relay means coupled thereto, said second signal being coupled to the trigger circuit and said sharp variation being effective to operate the trigger circuit which in turn operates said relay means to effect an output signal indicative of said sharp variation.

2. Apparatus as in claim 1 wherein said trigger circuit includes two valves, the first of which receives said second signal, and feedback means from the second valve to the first.

3. Apparatus as in claim 1 wherein said trigger circuit includes two valves the first of which receives said second signal, said means including relay means comprising two relays each having at least one set of contacts, and a vacuum tube, one of said relays being coupled in the plate-cathode circuit of said second valve with its set of contacts being coupled in the grid-cathode circuit of said vacuum tube, the other of said relays being coupled in the plate-cathode circuit of said vacuum tube, the arrangement being such that said sharp variation in the second signal causes said first valve to be conductive and said second valve to be non-conductive thereby de-energizing said one relay and making said vacuum tube non-conductive whereupon said other relay is de-energized and causes operation of its set of contacts for an indication of the occurrence of said sharp variation.

References Cited in the file of this patent

UNITED STATES PATENTS

| | | |
|---|---|---|
| 2,413,128 | Wills | Dec. 24, 1946 |
| 2,449,651 | Hathaway | Sept. 21, 1948 |
| 2,521,141 | Allen | Sept. 5, 1950 |
| 2,573,596 | Offner | Oct. 30, 1951 |
| 2,690,647 | Woodward | Oct. 5, 1954 |
| 2,694,900 | Brandau | Nov. 23, 1954 |
| 2,755,999 | Vickers | July 24, 1956 |